US012561479B2

(12) United States Patent
Matsuda et al.

(10) Patent No.: US 12,561,479 B2
(45) Date of Patent: Feb. 24, 2026

(54) SECURE COMPUTATION SYSTEM, METHOD, RECORDING MEDIUM, AND INFORMATION PROCESSING SYSTEM

(71) Applicant: NEC Corporation, Tokyo (JP)

(72) Inventors: Daisuke Matsuda, Tokyo (JP); Yoshiyuki Etou, Tokyo (JP); Satoru Fujii, Tokyo (JP); Ryo Furukawa, Tokyo (JP); Wataru Itonaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 94 days.

(21) Appl. No.: 18/293,410

(22) PCT Filed: Aug. 12, 2021

(86) PCT No.: PCT/JP2021/029709
§ 371 (c)(1),
(2) Date: Jan. 30, 2024

(87) PCT Pub. No.: WO2023/017597
PCT Pub. Date: Feb. 16, 2023

(65) Prior Publication Data
US 2024/0330512 A1     Oct. 3, 2024

(51) Int. Cl.
*G06F 21/00*     (2013.01)
*G06F 21/62*     (2013.01)
(52) U.S. Cl.
CPC ................................ *G06F 21/6254* (2013.01)
(58) Field of Classification Search
CPC ............................ G06F 21/6254; G06Q 40/00
See application file for complete search history.

(56) References Cited

U.S. PATENT DOCUMENTS

| | | | | |
|---|---|---|---|---|
| 10,769,603 | B1 * | 9/2020 | Prasad ................. | G06Q 20/042 |
| 11,538,036 | B2 * | 12/2022 | Uhr ....................... | H04L 9/3236 |
| 2013/0018800 | A1 * | 1/2013 | Devaraju ........... | G06Q 20/3823 |
| | | | | 705/75 |
| 2024/0330512 | A1 * | 10/2024 | Matsuda ............. | G06F 21/6254 |

FOREIGN PATENT DOCUMENTS

| | | | |
|---|---|---|---|
| JP | 6795863 | B1 | 12/2020 |
| JP | 6803598 | B1 | 12/2020 |

OTHER PUBLICATIONS

Gai et al., "Proactive Attribute-based Secure Data Schema for Mobile Cloud in Financial Industry", 2015 IEEE 17th International Conference on High Performance Computing and Communications (HPCC), 2015 IEEE 7th International Symposium on Cyberspace Safety and Security (CSS) (Year: 2015).*

(Continued)

*Primary Examiner* — Morshed Mehedi
(74) *Attorney, Agent, or Firm* — Sughrue Mion, PLLC

(57)     ABSTRACT

A secure computation system according to an aspect of the present disclosure includes: at least one memory configured to store instructions; and at least one processor configured to execute the instructions to: acquire financial transaction information possessed by each of a plurality of financial institutions in a concealed format; compute an index based on the financial transaction information of the plurality of financial institutions by secure computation; and output the index.

8 Claims, 7 Drawing Sheets

(56) References Cited

OTHER PUBLICATIONS

Singh et al., "Blockchain: Future of financial and cyber security," 2016 2nd International Conference on Contemporary Computing and Informatics (IC3I), Greater Noida, India, pp. 463-467 (Year: 2016).*

International Search Report for PCT Application No. PCT/JP2021/029709, mailed on Nov. 16, 2021.

English translation of Written opinion for PCT Application No. PCT/JP2021/029709, mailed on Nov. 16, 2021.

Shoko Nishida, "Specialists in each field explain easily! All you need to know about solution now", Business Communication, Jun. 1, 2019, vol. 56, No. 6, pp. 10 to 11.

JP Official Communication Action for JP Application No. 2023-541181, mailed on Dec. 3, 2024 with English Translation.

Le Trieu Phong, "Secret Computation Technology through the Fusion of Cryptography and AI" [online], Japan, National Institute of Information and Communications Technology, Jul. 18, 2019, pp. 1-30, [Retrieved on Sep. 2, 2024 from the Internet] <URL: https://shingi.jst.go.jp/pdf/2019/2019_nict_5.pdf>.

Hisashi Kashima, "Federated Learning" [online], Japan, May 6, 2021, pp. 1-24, [Retrieved on Sep. 2, 2024 from the Internet] <URL: https://hkashima.github.io/introductionFederatedLearning.pdf>.

Takao Takenouchi, "Comprehensive Explanation of 'Secret Computation': The Ingenious Mechanism of 'Secret Computation' for Utilizing Machine Learning While Protecting Personal Information", Nikkei Cross Tech [online], Japan, Dec. 12, 2019, [Retrieved on Sep. 2, 2024 from the Internet] <URL: https://xtech.nikkei.com/atcl/nxt/column/18/01130/120900004/>.

* cited by examiner

Fig.4

COMPARISON REPORT

| INCREASE RATE FROM PREVIOUS MONTH (JULY) | |
|---|---|
| FINANCIAL INSTITUTION A | AVERAGE OF FINANCIAL INSTITUTIONS A, B, AND C |
| 8% | 5% |

SECURE COMPUTATION SYSTEM, METHOD, RECORDING MEDIUM, AND INFORMATION PROCESSING SYSTEM

This application is a National Stage Entry of PCT/JP2021/029709 filed on Aug. 12, 2021, the contents of all of which are incorporated herein by reference, in their entirety.

TECHNICAL FIELD

The present disclosure relates to a secure computation system and the like.

BACKGROUND ART

In recent years, data analysis based on sensitive data such as personal information has been performed. It is desirable that data required to maintain confidentiality is analyzed in a concealed form. PTL 1 discloses a secure computation system that can perform computation while data is encrypted. PTL 2 discloses a system that utilizes data possessed by various companies without disclosing details of the data to other companies.

CITATION LIST

Patent Literature

PTL 1: JP 6795863 B1
PTL 2: JP 6803598 B1

SUMMARY OF INVENTION

Technical Problem

When a financial institution can compare information possessed by the financial institution with information possessed by another financial institution, the financial institution can utilize a comparison result for future marketing or the like. However, it is difficult to give information possessed by one financial institution to another financial institution.

An object of the present disclosure is to provide a secure computation system and the like that facilitate grasping of a trend of financial transactions of a plurality of financial institutions.

Solution to Problem

A secure computation system according to the present disclosure includes acquisition means that acquires financial transaction information possessed by each of a plurality of financial institutions in a concealed format, secure computation means that computes an index based on the financial transaction information of the plurality of financial institutions by secure computation, and output means that outputs the index.

A method according to the present disclosure includes acquiring financial transaction information possessed by each of a plurality of financial institutions in a concealed format, computing an index based on the financial transaction information of the plurality of financial institutions by secure computation, and outputting the index.

A program according to the present disclosure causes a computer to execute acquiring financial transaction information possessed by each of a plurality of financial institutions in a concealed format, computing an index based on the financial transaction information of the plurality of financial institutions by secure computation, and outputting the index.

Advantageous Effects of Invention

According to the present disclosure, grasping of a trend of financial transactions of a plurality of financial institutions is facilitated.

BRIEF DESCRIPTION OF DRAWINGS

FIG. 4 is a diagram illustrating an example of a comparison report.

EXAMPLE EMBODIMENT

Example Embodiments

Figure 1:
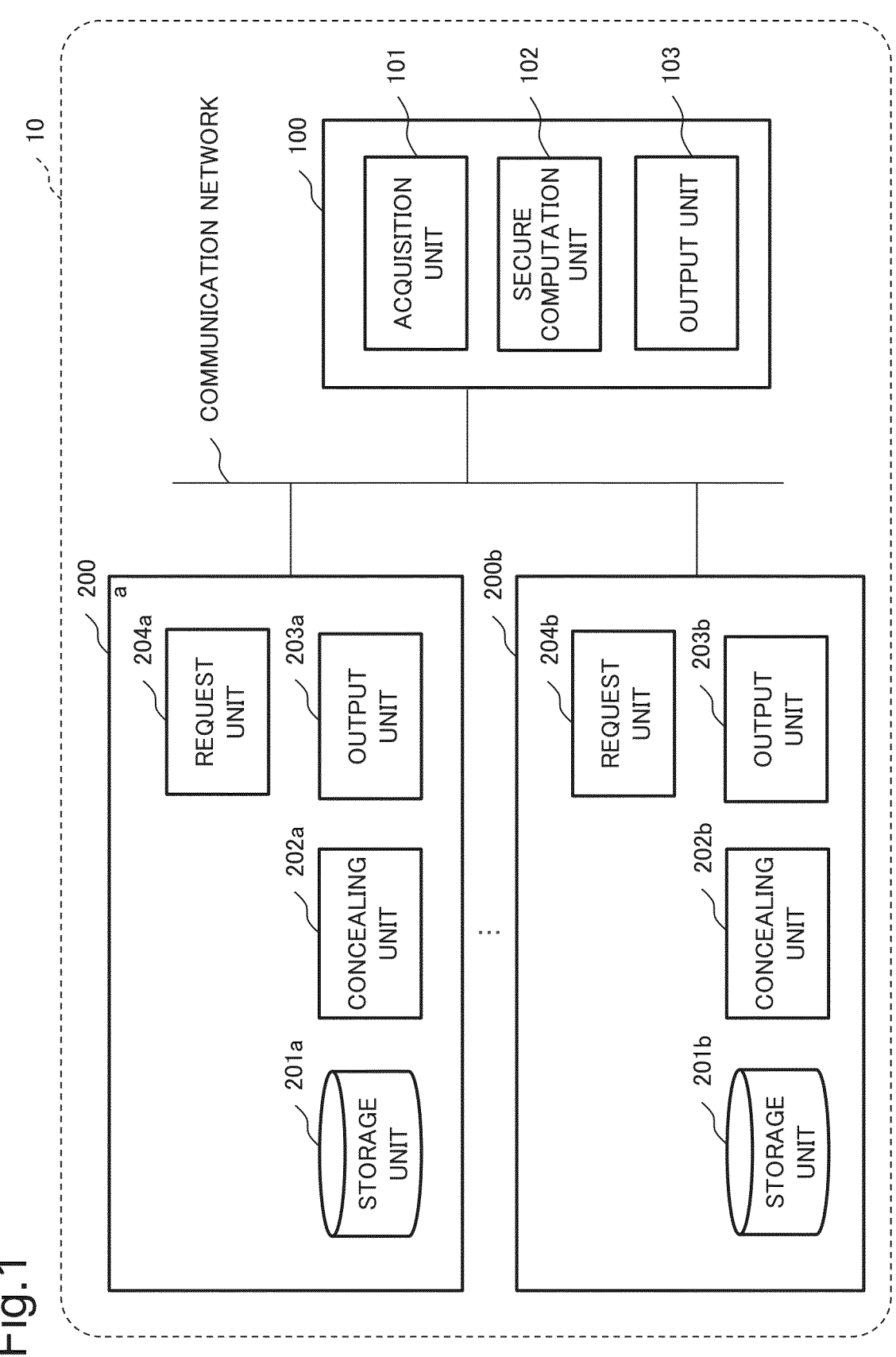
FIG. 1 is a block diagram illustrating a configuration of an information processing system 10.

FIG. 1 is a block diagram illustrating a configuration of an information processing system 10 in an example embodiment. The information processing system 10 is a system for performing analysis related to a trend of financial transactions based on financial transaction information possessed by each financial institution.

Examples of the financial institutions include credit card companies and settlement business operators that handle cashless settlement, in addition to business operators that handle financial products, such as banks (including city banks, Japan Post Bank, regional banks, Shinkin banks, and credit associations), securities companies, or insurance companies. As the financial institutions in an example embodiment, article rental agents that perform a leasing business or a rental business of automobiles and home electric appliances are also included. Examples of the financial products include a deposit, a bond, an investment trust, a foreign currency, insurance, a stock, a futures transaction, FX, a virtual currency, or the like.

The financial transaction information is information related to a transaction performed by a financial institution. Since the financial transaction information is confidential information, it is difficult to share the financial transaction information among a plurality of financial institutions. The financial transaction information includes, for example, one or both of sales information of the financial institution and customer information of customers of the financial institution. The financial transaction information only needs to be the information related to the transaction performed by the financial institution, and is not limited to the information described above.

The sales information of the financial institution indicates, for example, information related to sales of the one financial institution. The sales information may include, for example, a sales amount or the number of sales of a financial product sold by the financial institution, a trust fee amount, a profit amount due to a commission or interest, or an amount of a bond or stock transaction profit. The sales information may indicate an amount of money and the number of sales, but is not limited to these, and may indicate an increase rate of the amount of money, an increase rate of the number of sales, and the like. The sales information may indicate sales of one type of financial product, but is not limited to this. The sales information may indicate sales of equal to or more than two types of financial products.

The customers include an individual customer and a corporate customer. The customer information is information of the customers having transactions with the financial institution, and the customer information may include, for example, at least any one of the number of customers, a status of a past transaction, or customer attributes. The number of customers may be the total number of customers with which the financial institution has performed transactions so far, the number of customers with which the financial institution currently performs transactions, or the number of customers to be targeted in the future. The status of the past transaction is, for example, past deposit/withdrawal information of an account and information related to a financial product purchased by a customer in the past. The customer attributes include, for example, in the case of an individual customer, attributes such as an occupation, a gender, an age, a residence, and a family structure of the customer. In the case of a corporate customer, the customer attributes include attributes such as business content, a business size, and a location.

In the present example embodiment, a case where the financial transaction information is information related to a past transaction will be described as an example. In the present example embodiment, by using the information related to the past transaction, an index indicating a trend of performance of financial transactions of a plurality of financial institutions to be compared with performance of one financial institution is obtained.

The financial transaction information is not limited to the information related to the past transaction, and may be information related to a prediction or a target of a future transaction. The prediction and the target can be set by a manager of a financial institution or the like. The financial transaction information does not have to include at least a part of the information described above, and may include information other than the information described above.

Referring to FIG. 1, the information processing system 10 includes a secure computation system 100 and a plurality of financial institution systems 200 (200a, 200b).

The secure computation system 100 is operated by, for example, a service provider that provides a financial analysis service tool or the like to each financial institution. The service provider provides a financial analysis service for analyzing a trend of a plurality of financial institutions based on financial institution information acquired from each financial institution system 200.

The financial institution systems 200 are possessed and operated by individual financial institutions. In FIG. 1, the number of financial institution systems 200 is two, but is not limited to this. The plurality of financial institution systems 200 may be included as many as the number of financial institutions participating in analysis by the information processing system 10.

<Financial Institution Systems 200>

The financial institution systems 200 are examples of first systems. Each of the financial institution systems 200 includes a storage unit 201 (201a, 201b), a concealing unit 202 (202a, 202b), and an output unit 203 (203a, 203b). The financial institution system 200 may further include a request unit 204 (204a, 204b). The storage unit 201, the concealing unit 202, the output unit 203, and the request unit 204 are examples of storage means, concealing means, first output means, and request means, respectively.

The storage unit 201 stores financial transaction information. The concealing unit 202 conceals the financial transaction information stored in the storage unit 201. The concealing unit 202 may analyze the financial transaction information that is the stored raw data, and generate new financial transaction information. The concealing unit 202 may conceal the financial transaction information newly obtained by the analysis. The output unit 203 transmits the financial transaction information concealed by the concealing unit 202 to the secure computation system 100 in a concealed format via a communication network.

The request unit 204 requests the secure computation system 100 to transmit a result of computation by secure computation. The request unit 204 receives the computation result from the secure computation system 100. The received computation result is displayed on, for example, an optional display.

<Secure Computation System 100>

Next, the secure computation system 100 as a basic configuration of the present example embodiment will be described in detail. The secure computation system 100 is an example of a second system. The secure computation system 100 includes an acquisition unit 101, a secure computation unit 102, and an output unit 103. The acquisition unit 101, the secure computation unit 102, and the output unit 103 are examples of acquisition means, secure computation means, and output means (or second output means), respectively.

The acquisition unit 101 acquires financial transaction information possessed by each of a plurality of financial institutions in a concealed format. The acquisition unit 101 may acquire the financial transaction information from, for example, the output unit 203 included in each of the plurality of financial institution systems 200.

The secure computation unit 102 computes an index based on the financial transaction information of the plurality of financial institutions by secure computation. The secure computation is computation performed while data is concealed. The secure computation here is specifically to execute computation while the financial transaction information is concealed. Since the computation is performed while the financial transaction information is concealed, each financial institution can provide the possessed financial transaction information for analysis. An example of the secure computation and an example of the index will be described later.

The secure computation unit 102 computes, for example, an index with which a financial institution cannot be specified. The term "with which a financial institution cannot be specified" includes that individual financial transaction information or a value obtained based on the individual financial transaction information related to a specific financial institution among the plurality of financial institutions related to the computation of the index cannot be determined. Since the financial institution cannot be specified and the original financial transaction information cannot be specified from the index, each financial institution can use the index without disclosing the original information to other financial institutions.

The output unit 103 outputs the index that is a computation result of the secure computation unit 102. The output unit 103 outputs the index to, for example, the financial institution system 200. More specifically, the output unit 103 outputs the index to, for example, the request unit 204 of the financial institution system 200.

The secure computation unit 102 may execute the computation based on a request from the request unit 204 of the financial institution system 200. The output unit 103 may also output the index based on a request from the request unit 204.

Figure 2:
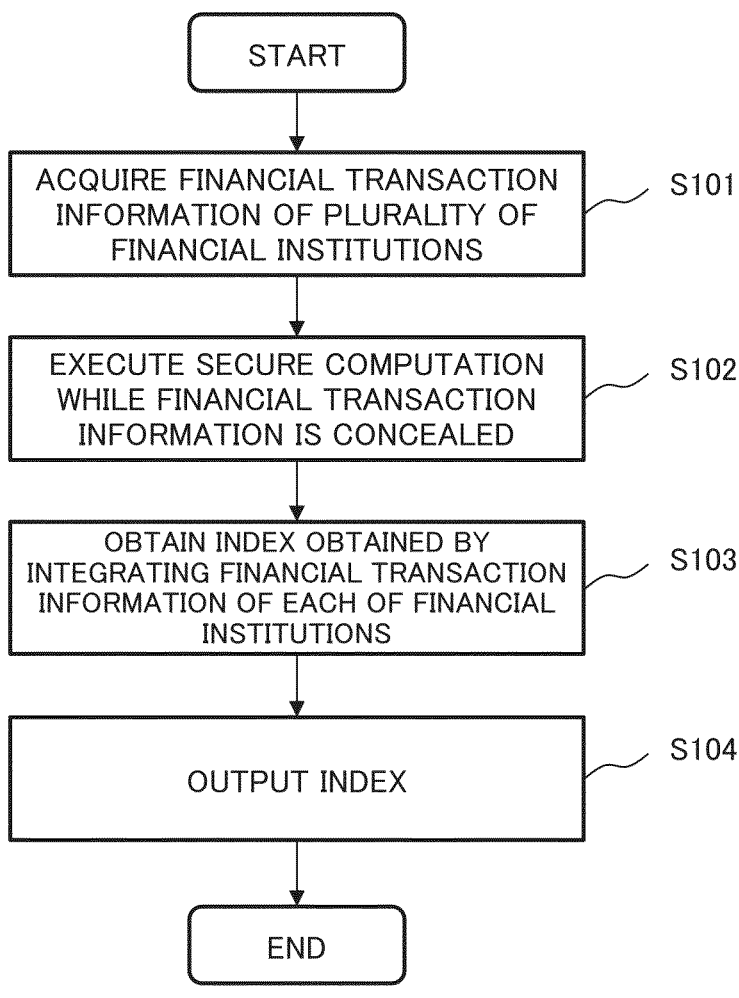
FIG. 2 is a flowchart illustrating an example of an operation of a secure computation system 100.

FIG. 2 is a flowchart illustrating an example of an operation of the secure computation system 100 according to an example embodiment. First, the acquisition unit 101 acquires financial transaction information possessed by each of a plurality of financial institutions in a concealed format (step S101).

The secure computation unit 102 executes secure computation while the financial transaction information acquired by the acquisition unit 101 is concealed (step S102). As a result of the secure computation, the secure computation unit 102 obtains an index based on the financial transaction information of the plurality of financial institutions (step S103).

(Example of Secure Computation)

As a secure computation method, special encryption related to specific processing such as homomorphic encryption, a trusted execution environment in which processing is performed in a state of being isolated on hardware, multiparty computation in which computation processing (secret sharing computation) is performed while secret sharing is performed by a plurality of servers, or the like can be used. The secure computation unit 102 may perform computation by, for example, the secure computation by using the financial transaction information concealed by secret sharing.

A specific method of secure computation of the multiparty computation includes the following examples. For example, concealed data a is distributed by secret sharing to distributed values x, y, . . . , and each of x, y, . . . is transmitted to a server. Next, computation is advanced while the servers perform communication with each other in a state where the concealed data a is subjected to secret sharing Finally, distributed values u, v, . . . of outputs, which are computation results of the servers, are collected and restoration processing is performed, whereby F(a) as a computation result is obtained. This computation result is an index based on financial transaction information of a plurality of financial institutions. Therefore, in a case where the multi-party computation is used as the secure computation method, the secure computation unit 102 is achieved by a plurality of servers. According to the multi-party computation, management of an encryption key and an isolated environment are unnecessary, and computation processing is generally faster.

(Example of Index)

The index based on the financial transaction information of the plurality of financial institutions computed by the secure computation unit 102 is an index indicating a trend of financial transactions of the plurality of financial institutions. The index based on the financial transaction information of the plurality of financial institutions is an index with which a financial institution cannot be specified and with which financial transaction information cannot be specified. The index may be information obtained by integrating the financial transaction information or a value obtained by statistically processing the financial transaction information. The index may be an index with which a position of one financial institution among the plurality of financial institutions can be grasped. The index based on the financial transaction information of the plurality of financial institutions is to be compared with a status of a financial institution to which a person in charge belongs for the person in charge of the financial institution.

An example of a case where the financial transaction information includes sales information of a financial product of each financial institution will be described. For example, the secure computation unit 102 may compute, as the index, a sum or an average of sales amounts of the plurality of financial institutions for sales of the financial product for a predetermined period. The index computed by the secure computation unit 102 may also be an average of increase rates of the sales amounts of the financial institutions, or the like.

The index may also be an index obtained by averaging, over the plurality of financial institutions, a ratio of a transaction amount for each financial product to a total transaction amount for each financial institution.

In a case where the financial transaction information includes transaction amounts of a plurality of financial products, such as a deposit amount and a sales amount of an investment trust, the index may be computed for each type of financial product. In a case where large classifications of an investment trust, a foreign currency, and insurance are further divided into small classifications by a type, the index may be computed for each of the large classifications or may be computed for each of the small classifications.

Figure 3:
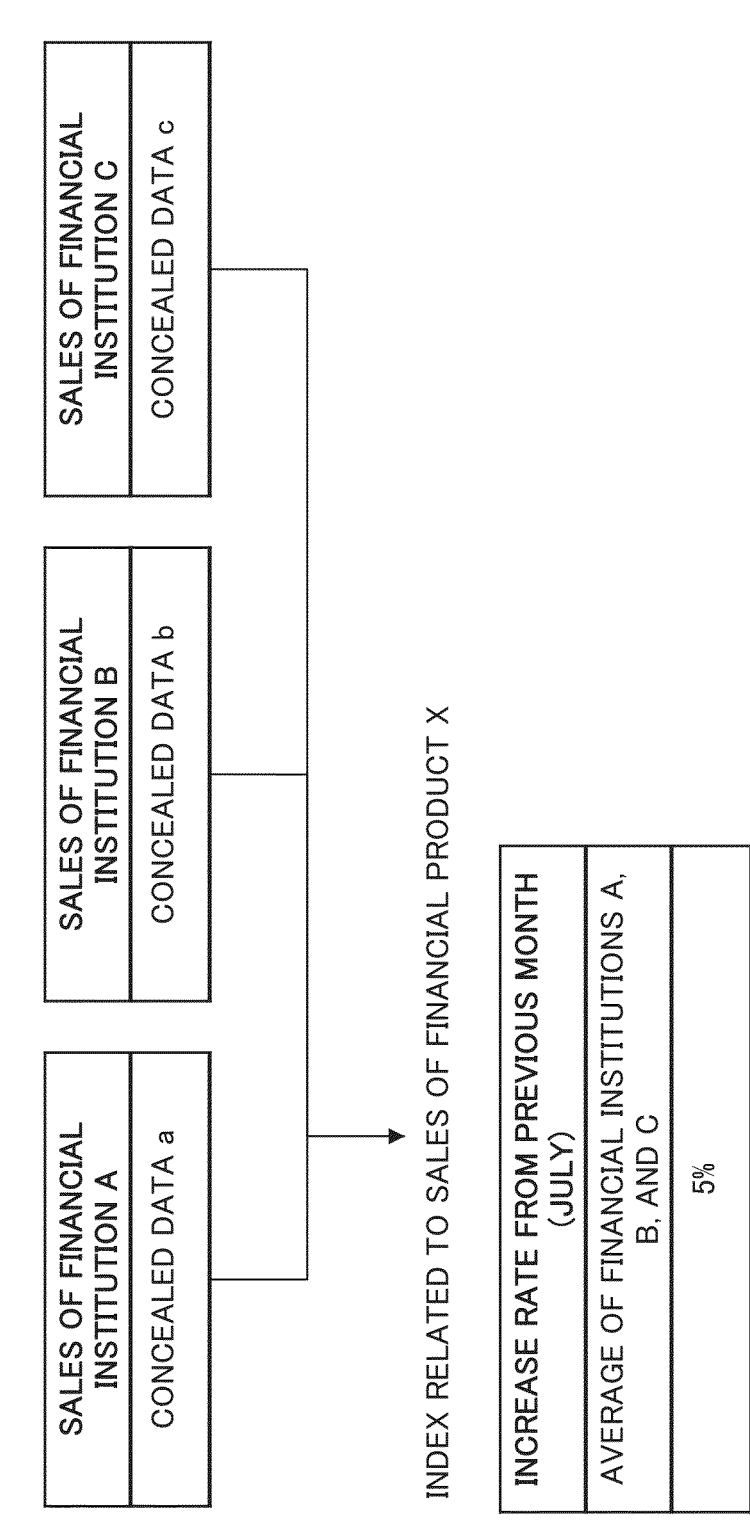
FIG. 3 is a diagram illustrating an example of an index.

FIG. 3 is a diagram illustrating an example of an index. The index in FIG. 3 is computed from financial transaction information of three financial institutions. The index indicates that, for an increase rate in transaction amount of a certain type of financial product X such as an investment trust from a previous month, an average increase rate of three financial institutions A, B, and C is 5%. From the index of the increase rate of 5%, each financial institution is not specified. Original financial transaction information is also not specified.

An example of a case where the financial transaction information includes customer information will be described. The secure computation unit 102 may compute, as the index, a sum or average of the number of customers of the plurality of financial institutions based on the customer information including the number of customers. The index computed by the secure computation unit 102 may also be an average of increase rates of the numbers of customers of the financial institutions, or the like.

In a case where the financial transaction information includes customer attributes, the index may be an index obtained by averaging, over the financial institutions, a ratio of the customer attributes for each financial institution. In a case where the financial transaction information includes both a status of a past transaction and customer attributes, the index may be an index obtained by averaging ratios of attributes of customers who have purchased a predetermined financial product for each financial institution. Specifically, for example, the secure computation unit 102 obtains a ratio of customers in an age range of 40 to 49 years old among purchasers of an investment trust based on the financial transaction information possessed by each financial institution. The secure computation unit 102 may compute, as the index, an average of ratios obtained for each financial institution. The secure computation unit 102 may similarly compute the index for a ratio of another age group. The secure computation unit 102 may compute the index based on, for example, an annual income class instead of the age group.

In the secure computation unit 102, the financial transaction information used for computing the index is not limited to the sales amount of the financial product and the customer attributes in the example described above, and another financial transaction information may be used. The secure computation unit 102 can compute various indexes based on various types of financial transaction information. The number of indexes computed by the secure computation unit 102 may be one, but is not limited to one. The secure computation unit 102 may compute a plurality of indexes.

The request unit 204 of the financial institution system 200 may receive an input on what type of index to request from a person in charge of a financial institution. The request unit 204 may request the secure computation unit 102 to compute the received type of index. At this time, the secure computation unit 102 computes the requested type of index based on the request.

The output unit 103 outputs the index computed by the secure computation unit 102 (step S104).
(Example of Output)

The number of indexes output by the output unit 103 may be one, but is not limited to one. The output unit 103 may output a plurality of indexes computed by the secure computation unit 102. The output unit 103 may output the index as a numerical value. Alternatively, the output unit 103 may output the index in a format of a table or an optional graph. Examples of the graph include a circular graph, a band graph, a bar graph, and a line graph.

A person in charge of a financial institution looks at the output index and compares the index with a status of the financial institution to which the person in charge belongs. For example, a future marketing policy and a management strategy of the financial institution are determined by using a comparison result.

The output unit 103 may extract information related to the index from a website or a social networking service (SNS) together with the index, and output the extracted information. Examples of the information related to the index include information related to a time indicated by the index. The output unit 103 may output, for example, an economic trend such as a market price, a press release of a financial institution, a press release of a company related to an investment trust, a personnel announcement of a financial institution, or news of an implemented campaign or advertisement, together with the index.

According to an example embodiment, the acquisition unit 101 acquires financial transaction information possessed by each of a plurality of financial institutions in a concealed format. The secure computation unit 102 computes an index based on the financial transaction information of the plurality of financial institutions by secure computation. The output unit 103 outputs the computed index. Therefore, grasping of a trend of financial transactions of the plurality of financial institutions is facilitated.

Modifications

<Output of Comparison Report>

In an example embodiment, the output unit 103 may further output an index based on financial transaction information of one financial institution. The index based on the financial transaction information of the one financial institution may be an index that can be compared with the index based on the financial transaction information of the plurality of financial institutions computed by the secure computation unit 102. Here, the financial transaction information of the one financial institution to be compared may or may not be used for the computation of the index based on the financial transaction information of the plurality of financial institutions. The secure computation unit 102 may execute the computation based on a request from the request unit 204 of the one financial institution. The output unit 103 may output the indexes of the one financial institution that has requested the computation and the plurality of financial institutions to the one financial institution.

An example of an output including the index based on the financial transaction information of the one financial institution and the index based on the financial transaction information of the plurality of financial institutions is hereinafter referred to as a comparison report.

The secure computation unit 102 may compute the index based on the financial transaction information of the one financial institution together with the index based on the financial transaction information of the plurality of financial institutions. In the following description, a case where the secure computation unit 102 generates the comparison report will be described. The comparison report may be generated by another element of the secure computation system 100, such as a report generation unit (not illustrated). Secure computation does not have to be used for generation of the comparison report.

The output unit 103 may output the comparison report for one type of index, but the report to be output is not limited to this. The output unit 103 may output the comparison report for a plurality of types of indexes.

FIG. 4 is a diagram illustrating an example of the comparison report. FIG. 4 illustrates an index of the financial institution A and indexes related to the financial institutions A, B, and C in a comparable manner. The index of the financial institution A indicates that an increase rate in transaction amount from a previous month is 8%. The indexes related to the financial institutions A, B, and C are similar to the indexes illustrated in FIG. 3.

Figure 5:
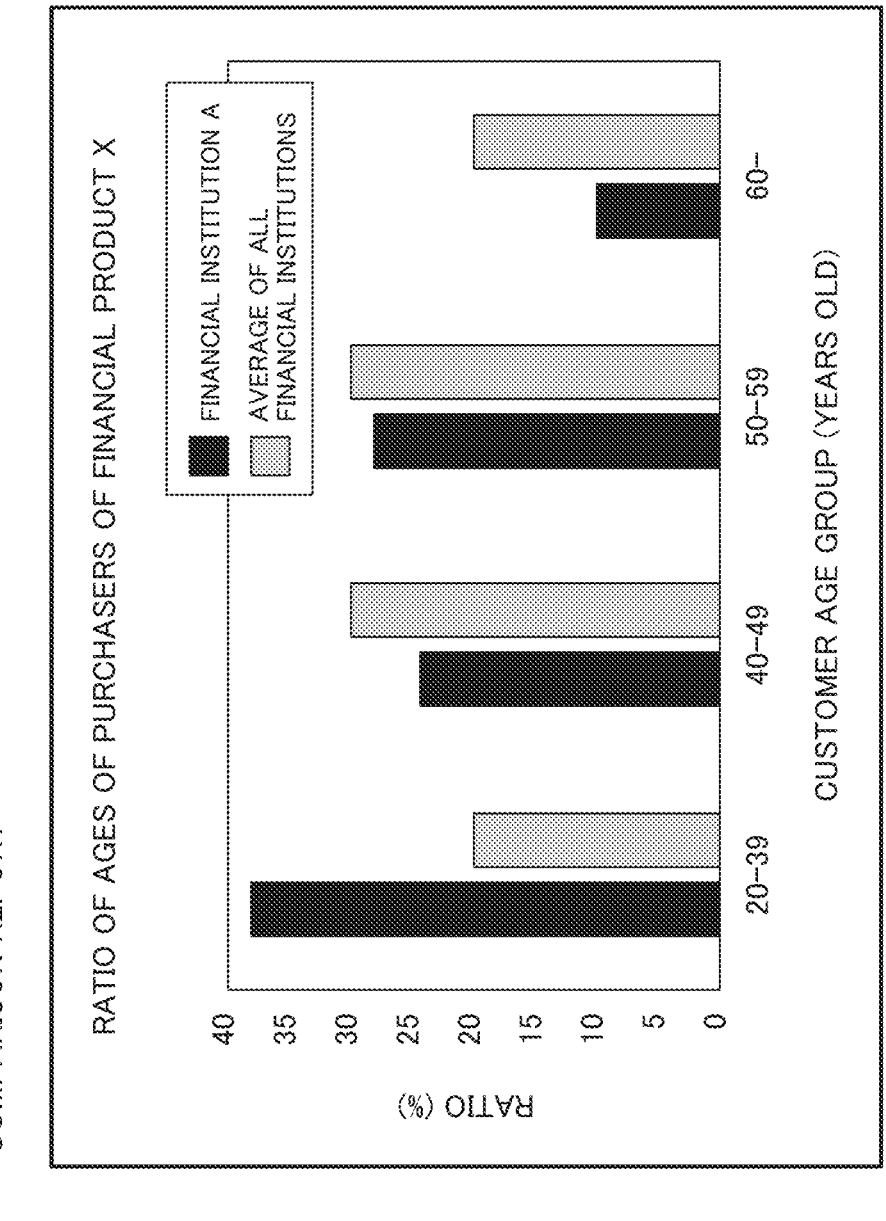
FIG. 5 is a diagram illustrating another example of the comparison report.

FIG. 5 is a diagram illustrating another example of the comparison report. FIG. 5 illustrates ratios of the financial institution A and averages of ratios of all the financial institutions participating in analysis for ratios of ages of purchasers of the financial product X. The ratio for the financial institution A is an example of the index based on the financial transaction information of the one financial institution. The average of the ratios for all the financial institutions is an example of the index based on the financial transaction information of the plurality of financial institutions.

Figure 6:
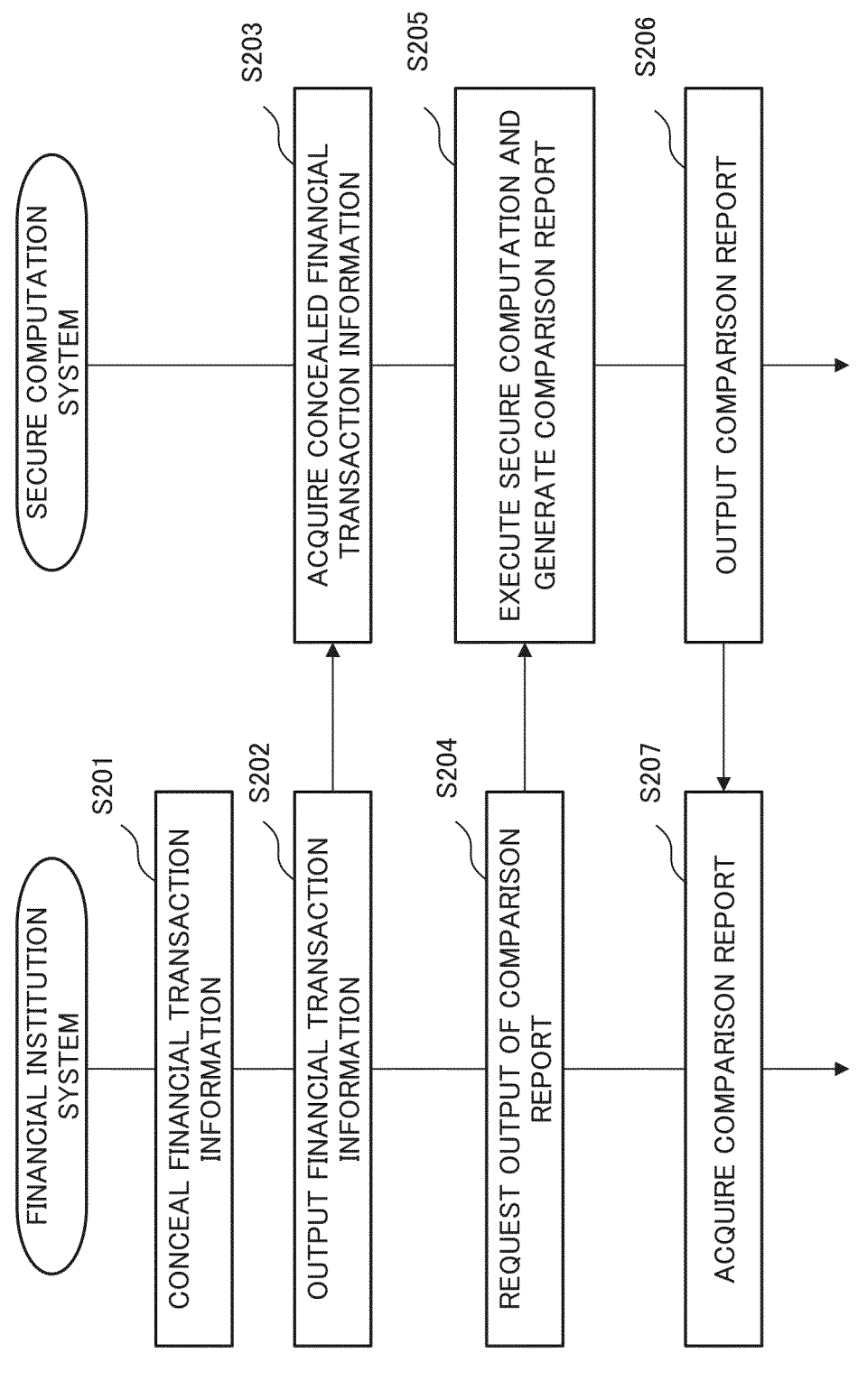
FIG. 6 is a flowchart illustrating an example of an operation of the information processing system 10.

An operation of the information processing system 10 in a case where the secure computation system 100 outputs the comparison report includes an operation when the secure computation system 100 outputs the index. FIG. 6 is a flowchart illustrating an example of the operation of the information processing system 10 in a case where the comparison report is output.

The concealing unit 202 of each financial institution system 200 conceals financial transaction information (step S201). The output unit 203 of each financial institution system 200 outputs the concealed financial transaction information to the secure computation system 100 (step S202).

The acquisition unit 101 of the secure computation system 100 acquires the concealed financial transaction information transmitted from the plurality of financial institution systems 200 (step S203).

The request unit 204 of at least one of the financial institution systems 200 requests an output of a comparison report (step S204). Based on the request, the secure computation unit 102 executes secure computation and generates the comparison report (step S205). Specifically, the secure computation unit 102 computes an index based on financial transaction information of one financial institution together with an index based on financial transaction information of a plurality of financial institutions. The secure computation unit 102 further generates a comparison report capable of comparing the indexes.

The output unit 103 outputs the generated comparison report to the financial institution system 200 (step S206). The request unit 204 acquires the comparison report from the secure computation system 100 (step S207). The acquired comparison report is displayed on, for example, a display such as a personal computer or a tablet used by a person in charge of a financial institution and is presented to the person in charge of the financial institution.

Each of the financial institutions can normally compute an index based on financial transaction information possessed by the financial institution itself. Therefore, the secure computation unit 102 does not have to compute the index based on the financial transaction information of the one financial institution. In this case, the output unit 203 of the financial institution system 200 may transmit the index of the one financial institution together with the financial transaction information. Alternatively, the request unit 204 may transmit the index of the one financial institution together with the request for the comparison report. At this time, the index of the one financial institution may be stored in advance in the storage unit 201, or may be computed by the concealing unit 202 or another element of the financial institution system 200. The index of the one financial institution may be concealed or does not have to be concealed by the concealing unit 202. The acquisition unit 101 may acquire the index based on the financial transaction information of the one financial institution from the financial institution system 200. The output unit 103 may output the comparison report described above by using the computed index and the acquired index.

<Combination of Financial Institutions>

In an example embodiment, the plurality of financial institutions is not limited to financial institutions of the same industry type, and may include a bank and a financial institution other than the bank, such as a bank and a securities company or an insurance company. Even in a case where the plurality of financial institutions includes banks, the financial institutions may include banks having different scales such as a city bank and a regional bank.

[Hardware Configuration]

In each of the example embodiments described above, components of the secure computation system 100 and the financial institution system 200 represent blocks in functional units. A part or all of components of each device may be achieved by an optional combination of a computer 500 and a program.

Figure 7:
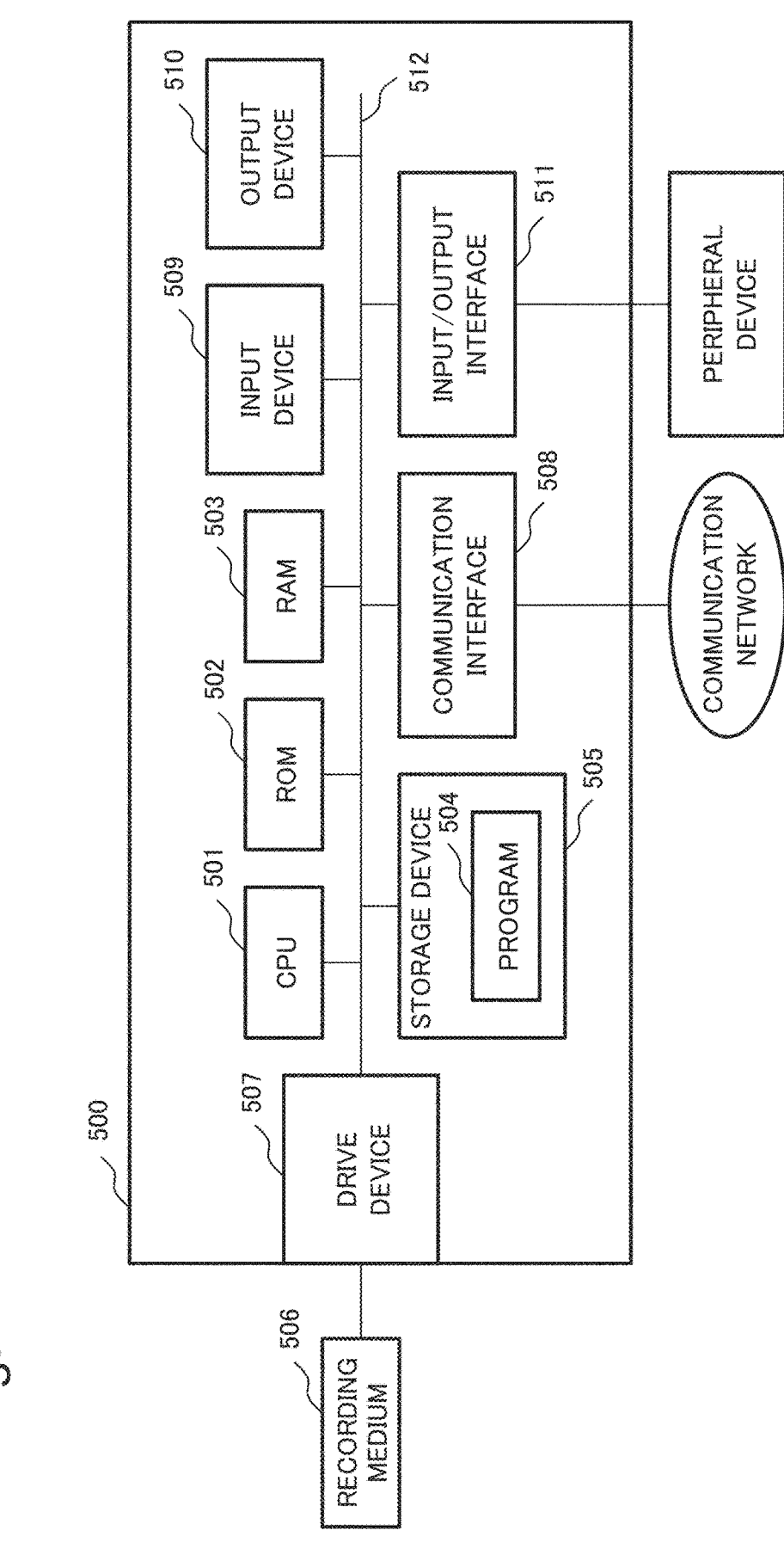
FIG. 7 is a block diagram illustrating an example of a hardware configuration of a computer 500.

FIG. 7 is a block diagram illustrating an example of a hardware configuration of the computer 500. Referring to FIG. 7, the computer 500 includes, for example, a central processing unit (CPU) 501, a read only memory (ROM) 502, a random access memory (RAM) 503, a program 504, a storage device 505, a drive device 507, a communication interface 508, an input device 509, an input/output interface 511, and a bus 512.

The program 504 includes an instruction for achieving each function of each device. The program 504 is stored in advance in the ROM 502, the RAM 503, and the storage device 505. The CPU 501 achieves each function of each device by executing instructions included in the program 504. For example, the CPU 501 of the secure computation system 100 executes instructions included in the program 504 to achieve the functions of the secure computation system 100. The RAM 503 may store data to be processed in each function of each device.

The drive device 507 reads and writes a recording medium 506. The communication interface 508 provides an interface with a communication network. The input device 509 is, for example, a mouse, a keyboard, or the like, and receives an input of information from a person in charge of a financial institution. An output device 510 is, for example, a display, and outputs (displays) information to the person in charge or the like. The input/output interface 511 provides an interface with a peripheral device. The bus 512 connects the components of the hardware. The program 504 may be supplied to the CPU 501 via the communication network, or may be stored in the recording medium 506 in advance, read by the drive device 507, and supplied to the CPU 501.

The hardware configuration illustrated in FIG. 7 is an example, and other components may be added or a part of the components does not have to be included.

There are various modifications in a method of achieving each device. For example, each device may be achieved by an optional combination of a computer and a program different for each component. A plurality of components included in each device may be achieved by an optional combination of one computer and program.

A part or all of the components of each device may be achieved by a general-purpose or dedicated circuitry including a processor or the like, or a combination of these. These circuitries may include a single chip or may include a plurality of chips connected via the bus. A part or all of the components of each device may be achieved by a combination of the circuitry described above or the like and a program.

In a case where a part or all of the components of each device is achieved by a plurality of computers, circuitries, and the like, the plurality of computers, circuitries, and the like may be arranged in a centralized manner or in a distributed manner.

While the present disclosure has been particularly shown and described with reference to exemplary embodiments thereof, the present disclosure is not limited to these embodiments. It will be understood by those of ordinary skill in the art that various changes in form and details may be made therein without departing from the spirit and scope of the present disclosure as defined by the claims. The configurations in the example embodiments can be combined with each other without departing from the scope of the present disclosure.

For example, although the plurality of operations is described in order in the format of the flowchart, the order of description does not limit the order of execution of the plurality of operations. Therefore, when each example embodiment is implemented, the order of the plurality of operations can be changed within a range that does not interfere in content.

A part or all of the example embodiments described above can also be described as the following Supplementary Notes, but are not limited to the following.

[Supplementary Note 1]

A secure computation system including:

acquisition means that acquires financial transaction information possessed by each of a plurality of financial institutions in a concealed format;

secure computation means that computes an index based on the financial transaction information of the plurality of financial institutions by secure computation; and output means that outputs the index.

[Supplementary Note 2]

The secure computation system according to Supplementary Note 1, in which the index is an index with which the financial institution is not capable of being specified.

[Supplementary Note 3]

The secure computation system according to Supplementary Note 1 or 2, in which the index is an index with which the financial transaction information is not capable of being specified.

[Supplementary Note 4]

The secure computation system according to any one of Supplementary Notes 1 to 3, in which the secure computation means executes computation based on a request from one financial institution, and the output means outputs the index to the one financial institution that has made the request.

[Supplementary Note 5]

The secure computation system according to any one of Supplementary Notes 1 to 4, in which the output means outputs an index based on financial transaction information of one financial institution, the index being comparable with the index based on the financial transaction information of the plurality of financial institutions.

[Supplementary Note 6]

The secure computation system according to Supplementary Note 5, in which the output means outputs a comparison report including the index based on the financial transaction information of the plurality of financial institutions and the index based on the financial transaction information of the one financial institution.

[Supplementary Note 7]

The secure computation system according to any one of Supplementary Notes 1 to 6, in which the financial transaction information includes one or both of sales information of the financial institution and customer information of a customer of the financial institution.

[Supplementary Note 8]

The secure computation system according to any one of Supplementary Notes 1 to 7, in which the secure computation means performs computation by secure computation by using the financial transaction information concealed by secret sharing.

[Supplementary Note 9]

A method including:

acquiring financial transaction information possessed by each of a plurality of financial institutions in a concealed format;

computing an index based on the financial transaction information of the plurality of financial institutions by secure computation; and outputting the index.

[Supplementary Note 10]

A recording medium that non-transiently records a program for causing a computer to execute:

acquiring financial transaction information possessed by each of a plurality of financial institutions in a concealed format;

computing an index based on the financial transaction information of the plurality of financial institutions by secure computation; and outputting the index.

[Supplementary Note 11]

An information processing system including a plurality of first systems and a second system, each of the first systems including:

storage means that stores financial transaction information possessed by a financial institution;

concealing means that conceals the financial transaction information; and first output means that transmits the financial transaction information to the second system in a concealed format, the second system including:

acquisition means that acquires the financial transaction information of a plurality of financial institutions from the plurality of first systems in a concealed format;

secure computation means that computes an index based on the financial transaction information of the plurality of financial institutions by secure computation; and second output means that outputs the index.

[Supplementary Note 12]

The information processing system according to Supplementary Note 11, in which the first system further includes request means that requests the second system to output the index, and the output means of the second system outputs an index based on the financial transaction information transmitted by the first system and the index based on the financial transaction information of the plurality of financial institutions in a comparable manner to the first system including the request means that has requested the output of the index.

REFERENCE SIGNS LIST

100 secure computation system
101 acquisition unit
102 secure computation unit
103 output unit
200 financial institution system
201 storage unit
202 concealing unit
203 output unit
204 request unit

What is claimed is:

1. A secure computation system comprising:

at least one memory configured to store instructions; and at least one processor configured to execute the instructions to:

acquire financial transaction information possessed by each of a plurality of financial institutions in a concealed format, wherein the financial transaction information includes one or both of:

sales information including at least one of sales amounts or numbers of financial products, trust fee amounts, profit amounts due to commissions or interests, or customer information including at least one of a number of customers, past transaction statuses, and customer attributes;

receive, from one financial institution, request for analysis of an index indicating a trend of financial transactions of the plurality of financial institutions;

compute the index requested based on the financial transaction information of the plurality of financial institutions while maintaining the financial transaction information in the concealed format by secure computation including at least one of: homomorphic encryption, multi-party computation with secret sharing, or processing in a trusted execution environment isolated on hardware; and output, to the one financial institution, a comparison report comparably presenting the index computed based on the financial transaction information of the plurality of financial institutions and an index based on the financial transaction information of the one financial institution.

2. The secure computation system according to claim 1, wherein the one financial institution is not capable of being specified from the index.

3. The secure computation system according to claim 1, wherein the financial transaction information is not capable of being specified from the index.

4. A method comprising:

acquiring financial transaction information possessed by each of a plurality of financial institutions in a concealed format, wherein the financial transaction information includes one or both of:

sales information including at least one of sales amounts or numbers of financial products, trust fee amounts, profit amounts due to commissions or interests, or customer information including at least one of a number of customers, past transaction statuses, and customer attributes;

receiving, from one financial institution, request for analysis of an index indicating a trend of financial transactions of the plurality of financial institutions;

computing the index requested based on the financial transaction information of the plurality of financial institutions while maintaining the financial transaction information in the concealed format by secure computation including at least one of: homomorphic encryption, multi-party computation with secret sharing, or processing in a trusted execution environment isolated on hardware; and outputting, to the one financial institution, a comparison report comparably presenting the index computed based on the financial transaction information of the plurality of financial institutions and an index based on the financial transaction information of the one financial institution.

5. A non-transient computer readable recording medium having instructions stored therein, which when executed by at least one processor cause the at least one processor to execute a method comprising:

acquiring financial transaction information possessed by each of a plurality of financial institutions in a concealed format, wherein the financial transaction information includes one or both of:

sales information including at least one of sales amounts or numbers of financial products, trust fee amounts, profit amounts due to commissions or interests, or customer information including at least one of a number of customers, past transaction statuses, and customer attributes;

receiving, from one financial institution, request for analysis of an index indicating a trend of financial transactions of the plurality of financial institutions;

computing the index requested based on the financial transaction information of the plurality of financial institutions while maintaining the financial transaction information in the concealed format by secure computation including at least one of: homomorphic encryption, multi-party computation with secret sharing, or processing in a trusted execution environment isolated on hardware; and outputting, to the one financial institution, a comparison report comparably presenting the index computed based on the financial transaction information of the plurality of financial institutions and an index based on the financial transaction information of the one financial institution.

6. An information processing system comprising a plurality of first systems and a second system, wherein each of the plurality of first systems includes:

at least one storage configured to store financial transaction information possessed by a financial institution;

at least one memory configured to store instructions; and at least one processor configured to execute the instructions to:

conceal the financial transaction information; and transmit the financial transaction information to the second system in a concealed format, and wherein the second system includes:

at least one memory configured to store instructions; and at least one processor configured to execute the instructions to:

acquire financial transaction information possessed by each of a plurality of financial institutions in the concealed format, wherein the financial transaction information includes one or both of:

sales information including at least one of sales amounts or numbers of financial products, trust fee amounts, profit amounts due to commissions or interests, or customer information including at least one of a number of customers, past transaction statuses, and customer attributes;

receive, from one financial institution, request for analysis of an index indicating a trend of financial transactions of the plurality of financial institutions;

compute the index requested based on the financial transaction information of the plurality of financial institutions while maintaining the financial transaction information in the concealed format by secure computation including at least one of: homomorphic encryption, multi-party computation with secret sharing, or processing in a trusted execution environment isolated on hardware; and output, to the one financial institution, a comparison report comparably presenting the index computed based on the financial transaction information of the plurality of financial institutions and an index based on the financial transaction information of the one financial institution.

7. The secure computation system according to claim 1, wherein the index is an average of increase rates of sales amounts of financial products of the plurality of financial institutions.

8. The secure computation system according to claim 1, wherein the at least one processor is further configured to execute the instructions to:

acquire the financial transaction information for a specific time period;

extract information related to the specific time period from a website or a social networking service; and output the information related to the specific time period in association with the index.

* * * * *